United States Patent Office 3,359,888
Patented Dec. 26, 1967

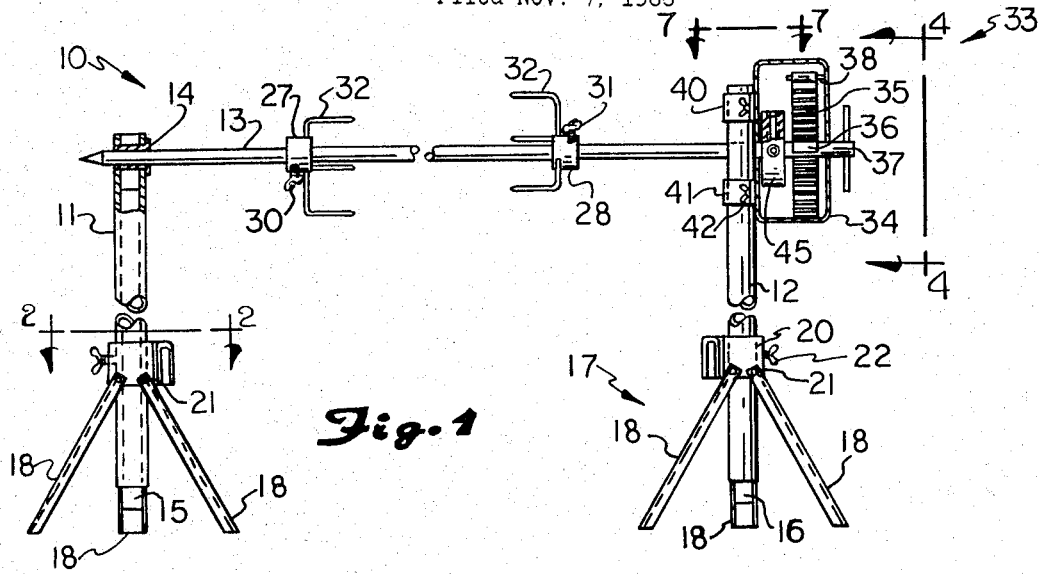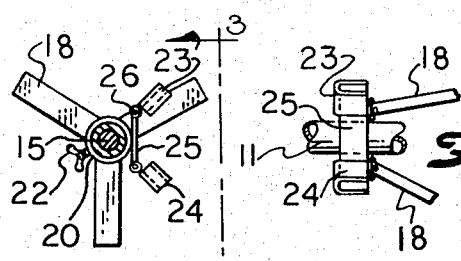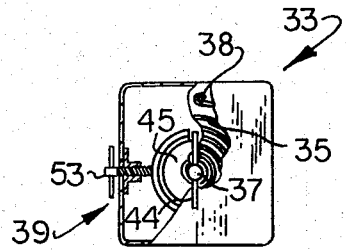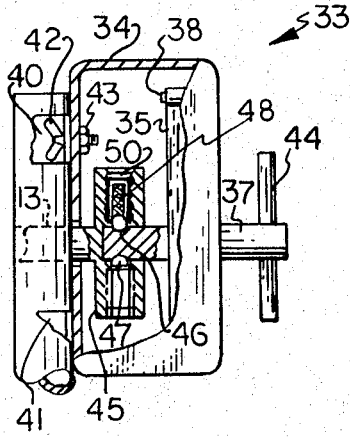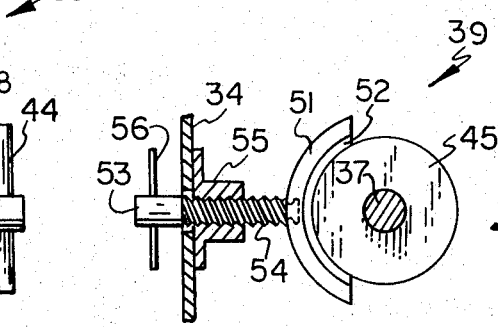

3,359,888
PORTABLE COOKING APPARATUS
Gean E. Deege and Walter Deege, both of 6642 Rhea
Ave., Reseda, Calif. 91335
Filed Nov. 7, 1966, Ser. No. 592,638
1 Claim. (Cl. 99—421)

ABSTRACT OF THE DISCLOSURE

A readily assembled and disassembled cooking apparatus is disclosed herein having a pair of upright stanchions disposed in fixed spaced apart relationship so as to support a rotatable spit rod carried on the ends of the stanchions whereby the spit rod is elevated above the apparatus supporting surface. A tripod base means is detachably carried on each of the stanchions for supporting the stanchions and the spit rod. A self-contained power means is detachably carried on a selected one of said stanchions and releasably coupled to one end of the spit rod for effecting the rotation thereof and control means are provided which are operatively coupled to the spit rod for selectively regulating the speed of rotation thereof and to selectively lock said spit rod against rotation when desired.

This invention relates to cooking apparatus and, more particularly, to an improved cooking apparatus of the broiler type adapted to be readily assembled and disassembled so as to provide a portable cooking apparatus of relatively few components and incorporating a self-contained power unit for driving a rotatable spit rod.

In the culinary art, many conventional cooking devices and apparatus have been employed for subjecting meat and other food to a heating process so that the food will be properly cooked to satisfy a variety of eating tastes. In some instances, particularly when the cooking of meats are involved, the food requires a relatively thorough heating procedure to assure that the food is cooked not only in the outer surface thereof, but that the center or middle portion of the food is properly cooked. One manner of providing a thorough heating procedure encompasses conventional means for rotating a plurality of food carrier spits about their own axis and at times, for rotating the spit horizontally about a central vertical axis over a heated area generally taking the form of a bowl serving as a fire box. Thereby, a particular surface or side of the food is progressively arranged to face the heating area as the spits are individually rotated on their axes while the food on the plurality of spits continually rotates horizontally about the central vertical axis over the heated area.

Generally, such conventional cooking means sometimes includes wheeled supports on which the fire box is mounted as well as a suitable electrically powered driving means for effecting the rotation of the spit rod. Also, it is conventional practice to detachably mount a hood on the edge of the fire box bowl to complete what is usually regarded as a portable barbecue cooking device. The portability factor is derived from the circumstance that the device is carried on wheels so that it can be readily moved from one location to another and from the fact that certain components such as the hood, drive motor and spit are detachably connected so that the assembled device can be readily disassembled and stored when the device is not in use.

However, difficulties and problems have been encountered with such a conventional cooking device in that the device is not truly portable since the device does not lend itself to a compact storage arrangement so that it may be easily carried in a hiker's pack, as part of a camper's or picknicker's equipment, or readily storable in confining or space limiting areas such as cabinets, auto trunks or the like. Furthermore, such conventional cooking devices employ electrically powered motors for driving the spit and, therefore, the device is restricted in use to only those areas having an available source of electricity and suitable connections for accommodating the coupling and operation of the motor.

Furthermore, conventional fireboxes used in a broiler type cooking apparatus do not always adequately control the heat radiating from fuel, such as coals or charcoal or the like, contained in the firebox so that radiant heat travels into sensitive areas of the apparatus such as the electrical motor, motor housing or in some instances, the moving parts. Thus, the structure in these sensitive areas become fatigued and rendered inoperative. Inasmuch as cooking of foods is related to the entire procedure dependent upon individual taste, it has been found desirable to employ some type of timing means or system to indicate the length of time that the food has been subjected to the heating process. Timers and other apparatus currently being employed are relatively expensive and are not particularly related to the individual food carrying skewers so that proper and adequate control over the cooking procedure is not accomplished.

These difficulties and problems are obviated in accordance with the present invention wherein an improved cooking apparatus is provided which includes a pair of upright stanchions arranged in fixed spaced apart relationship for supporting the opposite ends of a rotatable spit rod. Each stanchion of the pair includes a foldable tripod base for supporting the stanchions and the food bearing skewer rod. Each stanchion also includes an extension rod arranged in sliding relationship so that the height of the spit rod above the surface of the firebox can be selectively adjusted. Preferably, the stanchions and tripod bases are intended to be supported on a flat surface such as the ground, for example; however, means are provided on each stanchion for supporting the stanchions on the edge marginal region of the sidewall forming a standard fire bed bowl, if desired. A feature of the present invention resides in the provision of a self-contained driving means for effecting rotation of the spit rod as well as providing a speed control and locking system for regulating the speed of rotation of the spit rod and for determining the amount of cooking time that is directly related to the self-contained motor drive.

Therefore, it is a primary object of the present invention to provide an improved cooking apparatus of the broiler type which provides a minimum number of component parts and wherein the component parts are detachably coupled with respect to each other so that the device or apparatus may be readily assembled and disassembled.

Another object of the present invention is to provide a novel mounting and supporting arrangement employed in a broiler type cooking apparatus that may be readily adjusted to a desired height above the fire bed and that may be readily supported on the ground as well as on a conventional firebox bowl.

Still another object of the present invention is to provide a novel cooking apparatus that incorporates a self-contained power unit for rotating the spit rod thereof, and includes novel means for controlling the speed of spit rod rotation as well as the length of the power means operation.

A further object of the present invention is to provide a novel cooking apparatus which employs slidable collapsing stanchions and hingeable tripod supporting base combinations which are arranged in spaced apart relationship to support a rotating spit rod which is powered by a non-electrical drive means whereby the apparatus is constructed in a manner that permits the apparatus to be readily assembled for use and disassembled for compact storage.

A further object of the present invention is to provide a novel cooking apparatus of the broiler type that is economical to manufacture, simple to use and includes speed and timing controls for assuring the proper cooking of the food over a fire bed wherein the speed of horizontal spit rod rotation is controlled at a selected and known rate so that the food may be cooked according to individual taste.

Other objects and advantages of the present invention will become more readily apparent from the following detailed description of the unique structure and novel assembly techniques provided for by the present invention. It should be noted, however, that the following detailed description and accompanying drawing are merely intended as illustrative of the invention and not as a limitation thereon. Furthermore, in the following drawing, reference numerals shall be carried forward where applicable to designate like parts of the invention. The invention itself will be best understood when read in connection with the accompanying drawings, in which:

FIGURE 1 is a side elevational view of the novel portable cooking apparatus of the present invention illustrated in its assembled condition ready for use;

FIGURE 2 is a sectional view of one of the pair of supporting stanchions employed in the apparatus shown in FIGURE 1 as taken in the direction of arrows 2—2 thereof;

FIGURE 3 is a fragmentary side elevational view of the firebox bowl attaching means as taken in the direction of arrows 3—3 of FIGURE 2;

FIGURE 4 is an end elevational view of the spit rod driving means illustrating the housing therefor as being partially broken away to expose the components thereof;

FIGURE 5 is an enlarged side elevational view, partly in section, of the detent clutch means for coupling the drive means to the spit rod; and FIGURE 6 is an enlarged side elevational view, partly in section, of the lock and speed control means employed in the apparatus, while FIGURE 7 is a sectional view of FIGURE 1.

Referring to FIGURE 1, one embodiment of the novel cooking apparatus of the present invention is illustrated in the general direction of arrow 10 which includes a pair of stanchions 11 and 12 arranged in spaced apart relationship for supporting the opposite ends of a rotatable spit rod 13 by means of suitable bearings, such as bearing 14 carried on the extreme end of stanchion 11. In order to adjust the height of the spit rod 13 from the fire bed which would be located between the stanchions 11 and 12 beneath the spit rod, each stanchion includes an extension rod 15 and 16, respectively, that are arranged in sliding relationship with the respective stanchions. The stanchions are carried by the extensions 15 and 16, respectively, in a frictional fit between the inside surface of the bore extending through each stanchion and the outer periphery of the extension rod 15 and 16.

To stabilize the cooking apparatus 10 when in use, each stanchion is provided with a tripod base as indicated in the general direction of arrow 17 which includes at least three leg members, such as member 18, having one end thereof adapted to rest on a surface such as the ground and its opposite end pivotally secured to a collar 20 by means of a pivot pin 21. The collar 20 is adjusted to a desired position on the stanchion and is detachably secured thereto by means of a conventional wing screw 22 having a threaded shank which passes through the body of collar 20 and includes a terminating end which abuts with the outer periphery of the stanchion. In this fashion, the leg member 18 may be pivoted outwardly from the stanchion about connection 21 to support the stanchion when the apparatus is being used for cooking purposes. However, when it is desired to disassemble the apparatus, the leg member 18 may be pivoted inwardly and the collar 20 removed from the stanchion. If desired, the wing screw can be employed for securing the stanchion to its respective extension rod by permitting the threaded shank to pass through the wall of the stanchion into engaging securement with the extension.

A feature of the present invention resides in the fact that the stanchions may be readily supported on a conventional firebox, whether of annular bowl shape or of rectangular configuration, by means of a pair of U-shaped hook members 23 and 24 as illustrated more clearly in FIGURES 2 and 3. Hook members 23 and 24 are swingably secured to the opposite ends of a bracket 25 by means of single vertical axis pivot 26 so that the hook members may be positioned to readily accommodate engagement with a firebox of various diameters and configurations. The bracket 25 is secured to the collar 20 by any suitable means such as welding, for example. By employing a pair of hooked members associated with each stanchion 11 and 12, four mounting points are provided which are sufficient to stabilize and support the stanchions and spit rod 13 over the fire bed of the firebox.

Referring again to FIGURE 1, it is to be noted that the spit rod 13 carries a pair of detachable collars 27 and 28 that are secured in desired locations on the rod by means of wing screws 30 and 31, respectively. Each collar 27 and 28 includes a plurality of spits, such as spit 32, having one end thereof suitably secured to one collar and the opposite ends thereof arranged in opposition to the spits carried by the other collar. Construction in this fashion permits food to be mounted on the spit 32 by adjusting the collars 27 and 28 inwardly so that the spits 32 engage the opposite sides of the food to be broiled or roasted.

Carried on one end of the spit rod 13, there is provided a self-contained power and drive means indicated in the general direction of arrow 33 for rotatably driving the spit rod 13 in its bearings 14. The power unit includes a housing 34 enclosing a spring coil 35 having an end 36 thereof held in a slot formed in a shaft 37 and its opposite end secured to a pin 38 fixed to the interior of the housing 34. The housing includes a lock and speed control means indicated by the numeral 39. The housing 34 is detachably carried on the upper end of the one of the stanchions, such as stanchion 12, by means of suitable brackets 40 and 41 having U-shaped portions which are formed about the stanchion 12 and having attachment portions through which wing screws, such as screw 42, extend through one wall of the housing.

As shown more clearly in FIGURE 5, the threaded end of wing screw 42 is secured to the housing 34 by means of a fixed pressnut 43. An end portion of shaft 37 extends exteriorly of the housing 34 and includes a crank handle 44 which is intended to be manually grasped and rotated to wind up the coil spring 35. It is to be noted that the end of spit rod 13 terminates within the interior housing 34 in an enlarged diameter disk 45 that is recessed at its central axis to receive the end of shaft 37. This end of shaft 37 is formed with several recesses such as recess 46 for receiving a detent 47 of the ball type that is held within a bore formed in the disk by means of a spring 48 which operates against a threaded retainer 50 to bias the ball 47 into either the recess 46 or against that portion of the shaft 37 which separates the plurality of recesses 46. Construction in this manner permits the shaft 37 to be rotated when the spit rod 13 is held stationary so that the coil spring 35 may be wound to its tightened condition. The detent action of the plurality of detents 47 operate in conjunction with the recesses 46 provided in the shaft 37 to permit the manual winding of the coil spring 35 in such a fashion that the handle 44 may be released during the winding operation so that the handle may be regripped to continue rotation. Therefore, the detent operates as a lock which prevents the uncoiling of the wound spring until such time as the spit rod 13 is released in which event, the motor action of the coiled spring will cause not only shaft 37 to rotate, but the spit rod also. Furthermore, the detent means which couples the shaft 37 to the spit rod 13 functions as a clutch for operably engaging the spring motor to the spit rod.

Referring now to FIGURES 5 and 6, the spit rod lock and speed control means 39 is more clearly illustrated which takes the form of an arcuate member 51 having a shoe 52 carried on the inner periphery thereof which is selectively engageable with the circular periphery of the disk 45. Preferably, the shoe 52 is composed of an abrasive material such as rubber of about 60 Shore hardness or the like that will cause substantial friction to exist when the shoe is in engaging contact with the periphery of the disk 45. The diameter of the shoe 52 is preferably equal to the diameter of the disk 45 so that a large holding or braking surface is attained. Means are provided for urging the shoe 52 against the disk 45 and for releasing or removing the shoe therefrom which includes a shaft 53 having a threaded portion 54 rotatably secured at its extreme end to the arcuate member 51 and which passes through a threaded collar 55 secured by any suitable means to the wall of housing 34. A crank handle 56 is provided so that the handle may be manually grasped to rotate shaft 53 to urge the shoe 52 into engagement with the disk 45 or to remove the shoe therefrom. Therefore, it can be seen that the mechanism 39 provides a lock and speed control means operable for preventing the rotation of the spit rod 13 when the shaft 53 is rotated so that the shoe 52 is in tight engagement with the disk 45 and for controlling the speed to a desired rate of rotation by rotating the shaft 53 in an opposite direction to the point where the frictional engagement of the shoe 52 with the peripheral edge of disk 45 permits the rotation of the spit rod at a desired rate.

In view of the foregoing, it can be seen that the novel cooking apparatus of the present invention provides a suitable food cooker of the broiler type that may be readily assembled and disassembled. When disassembled, the spit rod 13 may be readily slid from bearing 14 on stanchion 11 and the wing nuts 42 may be disengaged so that the motor unit 33 may be removed from the spit rod. The tripod base 17 is detached by unscrewing wing nut 22 so that collar 20 may be slid from its location on these stanchions. Extension rods 15 and 16 may be slid inside of the stanchions 11 and 12 to reduce the stanchion overall length and the spit collars 27 and 28 may be removed from the spit rod to complete the disassembly operation. Once disassembled, the various components may be readily packaged together in a substantially small volume of space for storage purposes.

When the apparatus has been assembled for effecting a cooking operation, the coil spring 35 is wound by means of handle 44 while the shoe 52 is in tight engagement with the disk 45 to prevent the rotation of rod 13. Once the spring has been wound, the brake mechanism may be released by rotation of shaft 53 via handle 56 so that the biasing of the coil spring 35 may operate against the fixed pin 38 to rotate the spit rod 13. The speed at which the spit rod rotates is determined by the exact setting of the shoe 52 with respect to the disk 45 so that an effective speed control is obtained.

Having thus described the invention, it is apparent that numerous modifications and departures may be made therefrom by those skilled in the art, all of which fall within the scope contemplated by the invention. Consequently, the invention herein described is to be construed to be limited only by the spirit and scope of the appended claim.

We claim:

A portable cooking apparatus adapted to be readily assembled and disassembled and to be self supporting on the ground or supported on a fire bed bowl comprising:

a pair of upright stanchions disposed in fixed spaced apart relationship;

a spit rod rotatably carried on the ends of said stanchions whereby said spit rod is elevated above the apparatus supporting the surface;

a tripod base means detachably carried by each of said stanchions for supporting said stanchions and said spit rod on the apparatus supporting surface and further including a collar and a plurality of leg members pivotally connected at one end to said collar so that the opposite end of each leg member is adapted to be positioned outwardly from said stanchion;

a bracket fixedly carried on each of said collars;

a hook member having a downwardly opening arcuate slot and pivotally carried on each end of each bracket whereby said hook members are adapted to be detachably engageable with the side wall edge of a fire bed bowl;

a housing carried on a selected one of said stanchions;

a rotatable shaft carried on said housing having one end thereof releasably coupled to one end of said spit rod and having its opposite end extending exteriorly of said housing and being adapted to be manually rotated;

a pin fixed to said housing in fixed space relationship to said shaft;

a leaf spring coiled about said shaft having one end thereof secured to said shaft and having its opposite end secured to said pin for effecting the automatic rotation of said spit rod;

a disc coaxially carried on said spit rod;

an arcuate member adapted to move toward and away from said disc;

a shoe secured to the inner curvature of said arcuate member and adapted to frictionally engage with the circular periphery of said disc;

means rotatably carried on said housing and operatively coupled to said arcuate member to move said arcuate member in response to manual rotation thereof to selectively regulate the speed of spit rod rotation and to selectively lock said spit rod against rotation;

spring biased detent means releasably coupling said shaft to said spit rod; and bearing means mounted on each of said stanchions for rotatably mounting said spit rod.

References Cited

UNITED STATES PATENTS

| | | | |
|---|---|---|---|
| 1,051,502 | 1/1913 | Klein | 99—421 X |
| 1,666,394 | 4/1928 | Miglin | 99—421 |
| 2,263,715 | 11/1941 | Bobo | 99—421 |
| 2,505,976 | 5/1950 | Leon | 99—421 |
| 2,559,710 | 7/1951 | Danielsen | 126—9 |
| 2,783,705 | 3/1957 | Vrionis | 99—421 |
| 2,845,856 | 8/1958 | Sack. | |
| 3,008,406 | 11/1961 | Reeves et al. | 99—340 X |

WALTER A. SCHEEL, *Primary Examiner.*

J. M. NEARY, *Assistant Examiner.*